US012111855B1

(12) United States Patent
Dixit et al.

(10) Patent No.: US 12,111,855 B1
(45) Date of Patent: Oct. 8, 2024

(54) COMPUTATION, PREDICTION, AND USE OF VANDALISM SCORES

(71) Applicant: Kyndryl, Inc., New York, NY (US)

(72) Inventors: Archana Dixit, Agra (IN); Amol Bhaskar Mahamuni, Bangalore (IN); Kiran Kumar K, Bangalore (IN); Mahesh Sondkar, Pune (IN)

(73) Assignee: Kyndryl, Inc., New York, NY (US)

( * ) Notice: Subject to any disclaimer, the term of this patent is extended or adjusted under 35 U.S.C. 154(b) by 34 days.

(21) Appl. No.: 18/127,963

(22) Filed: Mar. 29, 2023

(51) Int. Cl.
*G06F 16/00* (2019.01)
*G06F 16/2457* (2019.01)
*G06F 16/28* (2019.01)
*G06F 16/29* (2019.01)

(52) U.S. Cl.
CPC ........ *G06F 16/29* (2019.01); *G06F 16/24578* (2019.01); *G06F 16/285* (2019.01)

(58) Field of Classification Search
CPC ... G06F 16/29; G06F 16/24578; G06F 16/285
See application file for complete search history.

(56) References Cited

U.S. PATENT DOCUMENTS

| | | | |
|---|---|---|---|
| 8,805,707 | B2 | 8/2014 | Schumann et al. |
| 9,786,141 | B2 * | 10/2017 | Grabham ............. G08B 25/008 |
| 9,802,571 | B2 | 10/2017 | Shreve et al. |
| 10,127,781 | B2 | 11/2018 | Bowers et al. |
| 11,354,671 | B2 | 6/2022 | Goshen et al. |

| | | | |
|---|---|---|---|
| 2013/0046680 | A1 * | 2/2013 | Friedlander .......... G06Q 10/063 705/39 |
| 2016/0125676 | A1 * | 5/2016 | Pouille ................... G07C 9/257 340/5.7 |
| 2016/0140651 | A1 * | 5/2016 | Prasad Va ............ G06Q 10/067 705/35 |
| 2016/0180667 | A1 * | 6/2016 | Bunker .................. H04N 7/186 382/103 |

(Continued)

OTHER PUBLICATIONS

Anonymous, "Method to detect fraudulent activities on local banks based on people behavior," IP.com Prior Art Database, Technical Disclosure No. IPCOM000256902D, Jan. 8, 2019, 8 pages.

(Continued)

*Primary Examiner* — Noosha Arjomandi
(74) *Attorney, Agent, or Firm* — CANTOR COLBURN LLP; Erik Swanson

(57) ABSTRACT

A computer-implemented method, in accordance with one embodiment, includes collecting data from a plurality of predefined functional areas in a particular geographical area in which a plurality of physical objects are located, at least some of the data relating to vandalism. Wrangling is performed on the data to correlate the data from the functional areas with respective ones of the physical objects. The wrangled data corresponding to each of the physical objects is transformed into features corresponding to a the functional areas. For each of the physical objects, the features are processed according to predefined rules for generating a rank for each of the functional areas. Dynamic weights are computed for at least some of the features to account for data drift by comparing historical data with latest data. The ranks and dynamic weights are transformed into a vandalism score for each of the physical objects, which is output.

20 Claims, 11 Drawing Sheets

(56) References Cited

U.S. PATENT DOCUMENTS

| | | | | |
|---|---|---|---|---|
| 2016/0379326 | A1* | 12/2016 | Chan-Gove | H04L 63/107 |
| | | | | 705/325 |
| 2017/0147927 | A1* | 5/2017 | Hwang | G06N 5/045 |
| 2017/0316596 | A1* | 11/2017 | Pollock | G06F 3/04845 |
| 2019/0057332 | A1* | 2/2019 | Hassan | G06Q 10/067 |
| 2020/0334569 | A1 | 10/2020 | Moghadam et al. | |
| 2021/0158356 | A1* | 5/2021 | Goshen | G06Q 20/4015 |
| 2021/0397903 | A1* | 12/2021 | Raj | H04L 67/535 |
| 2022/0215006 | A1* | 7/2022 | Lu | G06F 17/14 |
| 2022/0272064 | A1* | 8/2022 | Blanch | G06V 20/36 |
| 2023/0067026 | A1* | 3/2023 | Huts | G06V 20/00 |
| 2024/0160533 | A1* | 5/2024 | Lakkundi | G06F 11/2023 |
| 2024/0171613 | A1* | 5/2024 | Pereira | H04L 63/105 |

OTHER PUBLICATIONS

Wikipedia, "Vandalism," Wikipedia, 2023, 8 pages, retrieved from https://en.wikipedia.org/wiki/Vandalism.

Wright, G., "RFM analysis (recency, frequency, monetary)," TechTarget, 2021, 7 pages, retrieved from https://www.techtarget.com/searchdatamanagement/definition/RFM-analysis.

Wikipedia, "Cluster analysis," Wikipedia, 2023, 18 pages, retrieved from https://en.wikipedia.org/wiki/Cluster_analysis.

Basaklar et al., "Hypervector Design for Efficient Hyperdimensional Computing on Edge Devices," TinyML Research Symposium'21, Mar. 2021, 9 pages.

Wikipedia, "Data wrangling," Wikipedia, 2022, 5 pages, retrieved from https://en.wikipedia.org/wiki/Data_wrangling.

* cited by examiner

| ATM ID | Insurance Claims Value (in millions) | Frequency of Insurance Claims | Recency of Insurance Claims (Days) | Value Rank | Frequency Rank | Recency Rank | Insurance Claim Rank |
|---|---|---|---|---|---|---|---|
| 1 | 0 | 0 | 99999 | 1 | 1 | 1 | 1 |
| 2 | 0 | 0 | 99999 | 1 | 1 | 1 | 1 |
| 3 | 0.5 | 2 | 45 | 4 | 3 | 4 | 3.666666667 |
| 4 | 0.25 | 1 | 180 | 3 | 2 | 2 | 2.333333333 |
| 5 | 0 | 0 | 99999 | 1 | 1 | 1 | 1 |
| 6 | 0 | 0 | 99999 | 1 | 1 | 1 | 1 |
| 7 | 0.02 | 1 | 60 | 2 | 2 | 3 | 2.333333333 |
| 8 | 0 | 0 | 99999 | 1 | 1 | 1 | 1 |
| 9 | 0 | 0 | 99999 | 1 | 1 | 1 | 1 |
| 10 | 0 | 0 | 99999 | 1 | 1 | 1 | 1 |

| BINS | Insurance Claims range (in millions) | Expected Count | Actual Count | Expected %(Ex) | Actual %(Ac) | Ac-Ex | ln(Ac/Ex) | PSI |
|---|---|---|---|---|---|---|---|---|
| 1 | <0.1 | 1 | 1 | 1 | 23 | -7 | -0.2657 | 0.0186 |
| 2 | 0.1-0.2 | 1 | 1 | 3 | 15 | -5 | -0.2877 | 0.0144 |
| 3 | 0.2-0.3 | 4 | 4 | 6 | 12 | -3 | -0.2231 | 0.0067 |
| 4 | 0.3-0.4 | 8 | 8 | 15 | 9 | -2 | -0.2007 | 0.0040 |
| 5 | 0.4-0.5 | 27 | 27 | 18 | 9 | 1 | 0.1178 | 0.0012 |
| 6 | 0.5-0.6 | 22 | 22 | 23 | 7 | 1 | 0.1542 | 0.0015 |
| 7 | 0.6-0.7 | 16 | 16 | 26 | 5 | 1 | 0.2231 | 0.0022 |
| 8 | 0.7-0.8 | 12 | 12 | 14 | 6 | 3 | 0.6931 | 0.0208 |
| 9 | 0.8-0.9 | 6 | 6 | 9 | 6 | 4 | 1.0986 | 0.0439 |
| 10 | <0.9 | 3 | 3 | 3 | 8 | 7 | 2.0794 | 0.1456 |

Dynamic Weight 0.2589

FIG. 7

| ATM ID | Transaction PSI | Replenish-ment PSI | Population Demographic PSI | Geo Social PSI | Insurance Claim PSI | Geospatial PSI | Security Video Analysis PSI | Group Sum Total |
|---|---|---|---|---|---|---|---|---|
| 1 | 0.2381 | 0.3829 | 0.1258 | 0.229 | 0.2589 | 0.0089 | 0.1582 | 1.4018 |
| 2 | 0.4531 | 0.9513 | 0.1145 | 0.6003 | 0.6453 | 0.113 | 0.0153 | 2.8928 |
| 3 | 0.3537 | 0.6752 | 0.2637 | 0.4372 | 0.6537 | 0.337 | 0.1536 | 2.8741 |
| 4 | 0.2912 | 0.4372 | 0.2732 | 0.1432 | 0.1432 | 0.0736 | 0.0732 | 1.4348 |
| 5 | 0.6032 | 0.1202 | 0.2021 | 0.0231 | 0.1002 | 0.202 | 0.1287 | 1.3795 |
| 6 | 0.1689 | 0.1089 | 0.0681 | 0.0689 | 0.689 | 0.1892 | 0.1089 | 1.4019 |
| 7 | 0.8324 | 0.7534 | 0.1532 | 0.1204 | 0.5324 | 0.3532 | 0.2324 | 2.9774 |
| 8 | 0.2912 | 0.3219 | 0.0932 | 0.0193 | 0.1932 | 0.1291 | 0.0793 | 1.1272 |
| 9 | 0.2231 | 0.2313 | 0.1312 | 0.1231 | 0.2231 | 0.0312 | 0.1231 | 1.0861 |
| 10 | 0.0113 | 0.1123 | 0.1023 | 0.0613 | 0.0123 | 0.0023 | 0.1121 | 0.4139 |

| ATM ID | Transaction Rank | Replenish-ment Rank | Population Demogrph Rank | Geo Social Rank | Insurance Claim Rank | Geospatial Rank | Security Video Analysis Rank | Group Sum Total | R vs M score | F vs M score | Dynamic Weight Total | Net Vandalism Score | Cluster Zones |
|---|---|---|---|---|---|---|---|---|---|---|---|---|---|
| 1 | 1 | 1 | 1 | 1 | 1 | 1 | 1 | 7 | 1 | 1 | 1.4018 | 0.641483 | Zone1 |
| 2 | 4.39 | 2.33 | 1 | 1 | 1 | 1.33 | 1 | 12.05 | 1 | 1 | 2.8928 | 1.001425 | Zone3 |
| 3 | 1 | 1.67 | 1.961494 | 1 | 3.67 | 1 | 3.67 | 13.97149 | 1 | 0.75 | 2.8741 | 1.120563 | Zone3 |
| 4 | 3.67 | 1 | 1 | 1 | 2.33 | 1 | 2.33 | 12.33 | 0.666667 | 0.666667 | 1.4348 | 0.973866 | Zone2 |
| 5 | 1.33 | 1 | 2.67 | 3 | 1 | 1 | 1 | 11 | 1 | 1 | 1.3795 | 0.926586 | Zone2 |
| 6 | 2.33 | 1 | 1 | 1 | 1 | 2.67 | 1 | 10 | 1 | 1 | 1.4019 | 0.85531 | Zone2 |
| 7 | 1 | 1 | 4.37 | 2 | 2.33 | 1 | 2.33 | 14.03 | 1.5 | 1 | 2.9774 | 1.17819 | Zone3 |
| 8 | 1 | 3.67 | 1 | 2.33 | 1 | 1 | 1 | 11 | 1 | 1 | 1.1272 | 0.926586 | Zone2 |
| 9 | 1 | 1 | 1 | 1.67 | 1 | 1 | 1 | 7.67 | 1 | 1 | 1.0861 | 0.689237 | Zone1 |
| 10 | 1.91 | 1 | 1 | 1 | 1 | 1.67 | 1 | 8.58 | 1 | 1 | 0.4139 | 0.754098 | Zone1 |

COMPUTATION, PREDICTION, AND USE OF VANDALISM SCORES

BACKGROUND

The present invention relates to prediction and use of vandalism scores, and more specifically, this invention relates to accurate prediction of the likelihood of vandalism for particular geographical areas.

Vandalism is generally defined as an action resulting in deliberate damage and/or destruction of another's property, whether that property is public or private.

Physical damage and destruction of valuable devices or assets, such as automatic teller machines (ATMs); buildings, such as branch locations; and so on, is on the rise. Much of this damage is due to vandalism. For example, large costs are incurred by banks and financial institutions across the world to repair and replaces vandalized ATMs, intentionally broken windows, etc.

SUMMARY

A computer-implemented method, in accordance with one embodiment, includes collecting data from a plurality of predefined functional areas in a particular geographical area in which a plurality of physical objects are located, at least some of the data relating to vandalism within the geographical area. Wrangling is performed on the data to correlate the data from the functional areas with respective ones of the physical objects. The wrangled data corresponding to each of the physical objects is transformed into features, each feature corresponding to a respective one of the functional areas. For each of the physical objects, the features are processed according to predefined rules for generating a rank for each of the functional areas. Dynamic weights are computed for at least some of the features to account for data drift by comparing historical data with latest data. The ranks and dynamic weights are transformed into a vandalism score for each of the physical objects. At least some of the vandalism scores and/or derivatives thereof are output.

A computer program product for computing a vandalism score for each of a plurality of physical objects, in accordance with one embodiment, includes a computer readable storage medium having program instructions embodied therewith, the program instructions executable by a computer to cause the computer to perform the foregoing method.

A system, in accordance with one embodiment, includes a hardware processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 7 is a table illustrating calculation of weights for the insurance claims functional area for an object, in accordance with one exemplary approach.

FIG. 8 is a table listing the dynamic weights computed for each functional area, for each of ten ATMs, in accordance with one exemplary embodiment.

DETAILED DESCRIPTION

Figure 1:
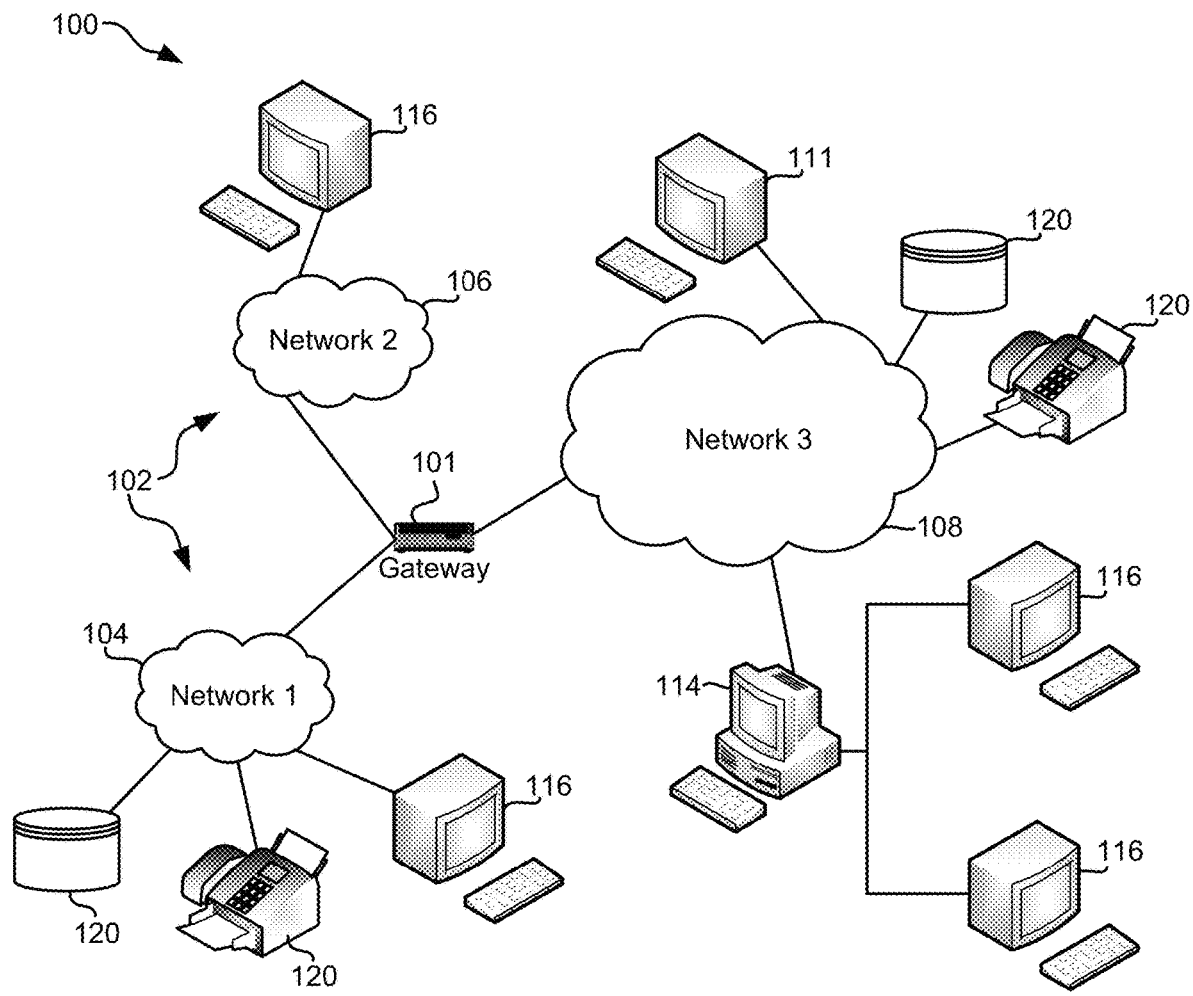
FIG. 1 is a diagram of a network architecture, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for computing and predicting a vandalism score for particular geographical areas using normalized data.

In one general embodiment, a computer-implemented method includes collecting data from a plurality of predefined functional areas in a particular geographical area in which a plurality of physical objects are located, at least some of the data relating to vandalism within the geographical area. Wrangling is performed on the data to correlate the data from the functional areas with respective ones of the physical objects. The wrangled data corresponding to each of the physical objects is transformed into features, each feature corresponding to a respective one of the functional areas. For each of the physical objects, the features are processed according to predefined rules for generating a rank for each of the functional areas. Dynamic weights are computed for at least some of the features to account for data drift by comparing historical data with latest data. The ranks and dynamic weights are transformed into a vandalism score for each of the physical objects. At least some of the vandalism scores and/or derivatives thereof are output.

In another general embodiment, a computer program product for computing a vandalism score for each of a plurality of physical objects includes a computer readable storage medium having program instructions embodied therewith, the program instructions executable by a computer to cause the computer to perform the foregoing method.

In another general embodiment, a system includes a hardware processor, and logic integrated with the processor, executable by the processor, or integrated with and executable by the processor. The logic is configured to perform the foregoing method.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM-based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
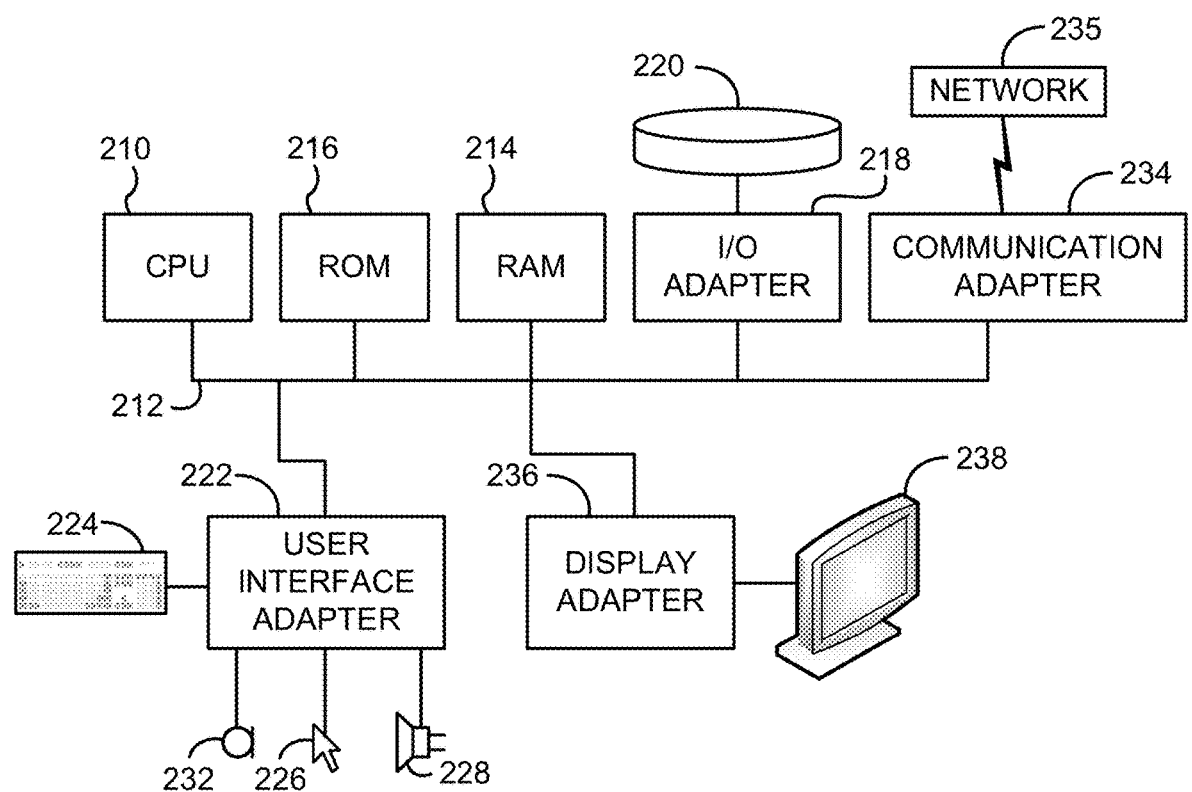
FIG. 2 is a diagram of a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object-oriented programming methodology. Object-oriented programming (OOP), which has become increasingly used to develop complex applications, may be used.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Vandalism affects customer services significantly, due to the impact on availability of the business asset, and therefore has a direct impact on end users and customer satisfaction. Moreover, the resulting non-availability of devices results in downtime of the business service, costing the owning business lost revenue.

The potential for vandalism also affects business decisions, such as whether to set up new business in certain areas, as such areas might be more prone to attacks, looting and significant business losses. For example, businesses interested in deploying assets in particular geographical areas would be wise to assess vandalism in those areas to assess the risk of doing so.

Moreover, areas subject to frequent vandalism may be less likely to be frequented by customers.

With digital transformation on the rise, vandalism will pose a significant problem, especially to businesses with exposed electronic infrastructure such as ATMs.

The following methodology enables organizations to not only characterize vandalism on a per-physical-object basis, but also predict vandalism for a particular area before it occurs.

Various embodiments include a methodology to compute and predict a vandalism score using a computation mechanism which normalizes the data across a hyperdimensional space, and thus corresponding to multiple data feeds, thereby reducing the inherent skew and bias in the data. The methodology may also be extended to employ transfer learning to predict vandalism across industries which can benefit from vandalism event predictions upfront.

In some approaches, data from multiple functional areas is combined and preprocessed to provide a robust result. A functional area can be generally defined as an area relevant to the industry and/or physical objects for which a vandalism score is to be computed. Several exemplary functional areas relevant to ATMs are provided below. This has been done by way of example only, and any functional area corresponding to any type of data that would become apparent to one skilled in the art after reading the present disclosure may be used.

Note that while ATMs are used as an example of the physical objects, for which vandalism scores are to be computed, throughout the following description, this has been done by way of example only to provide a context for various embodiments of the present invention. Accordingly, the teachings herein are equally applicable to any physical object, such as a building, a vending machine, a kiosk, etc., as would become apparent to one skilled in the art after reading the present disclosure.

Figure 3:
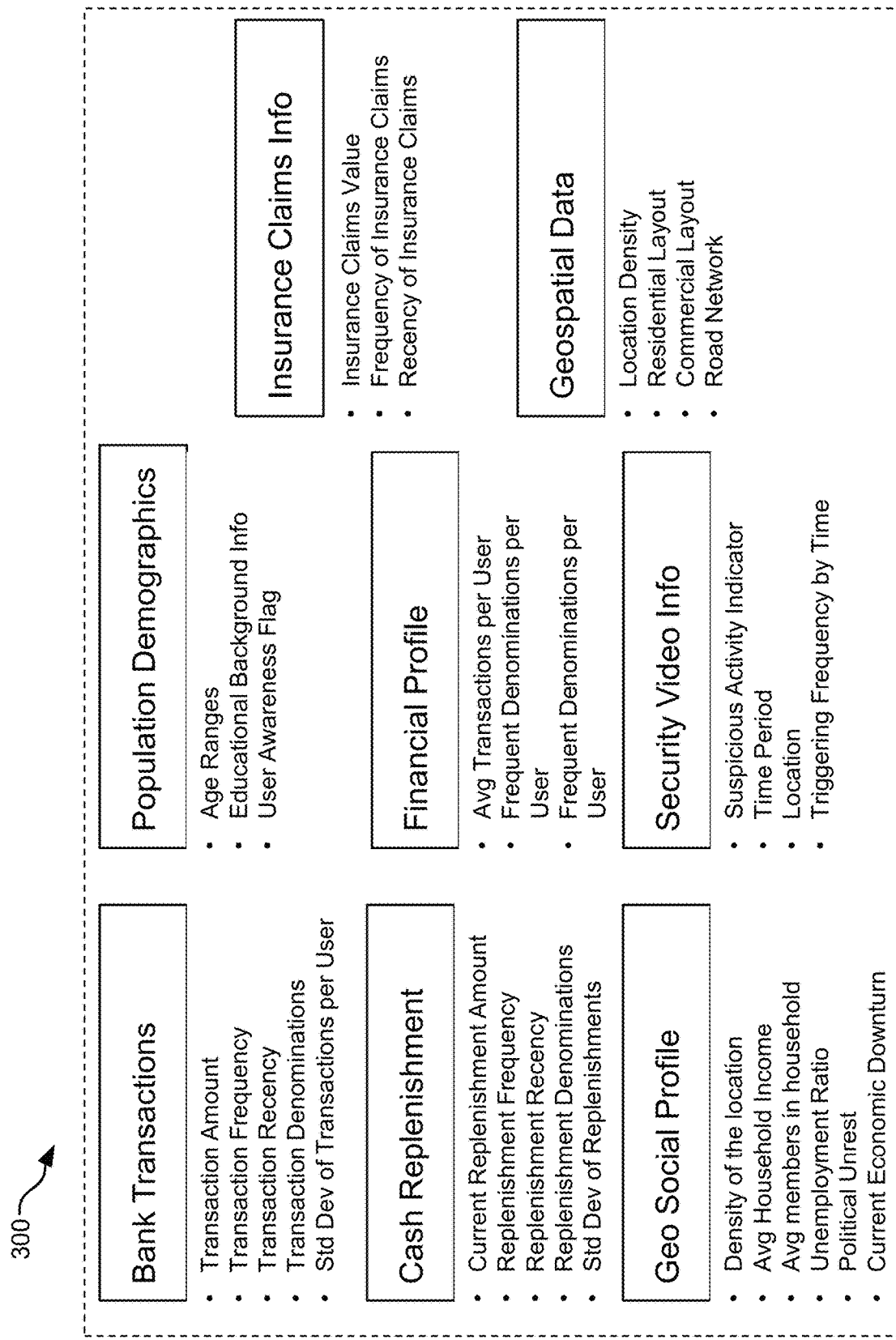
FIG. 3 is a representation of a hyperdimensional vector space having several functional areas relevant to ATMs. In accordance with one exemplary embodiment.

FIG. 3 illustrates a hyperdimensional vector space 300 having several functional areas relevant to ATMs. As shown, the functional areas relevant to ATMs include bank transactions, population demographics, financial profile information, geographic social profile information, cash replenishment metrics, security video-related information, insurance claims information, and geospatial data. Note that other and/or alternative functional areas may be included in the hyperdimensional vector space 300, such as social media feeds, etc.

The exemplary data types listed under each functional area may have their usual and customary meaning, as well as any meaning that would become apparent to one skilled in the art after reading the present disclosure. Moreover, the exemplary data types listed are not intended to be an exclusive or exhaustive list of data types for the particular functional area; rather, more, fewer, and/or other data types may be present in any of the functional areas shown.

The data in each functional area may be obtained from any suitable source. For example, the bank transaction data may be received from a bank, and may include specification of what the data is, which location the data corresponds to, how recent the data is, what time the data corresponds to (e.g., via timestamp), etc. Population demographics data may be determined from publicly available sources, such as census data, survey data, etc.

Note that any data about people in the geographical area of interest is preferably received from a public source, and is based on an aggregation of data that is not specific or identifiable to any one person. Such public source may include consolidated census data, consolidated survey data, etc. For example, demographic data may include a percentage or an estimated number of people within the zone that are in particular age ranges, such as under 20 years old, 20-30 years old, 31-40 years old, and so on.

The data used to construct the hyperdimensional space 300 is in turn used for computing and predicting vandalism scores for each physical object in the geographical area.

Figure 4:
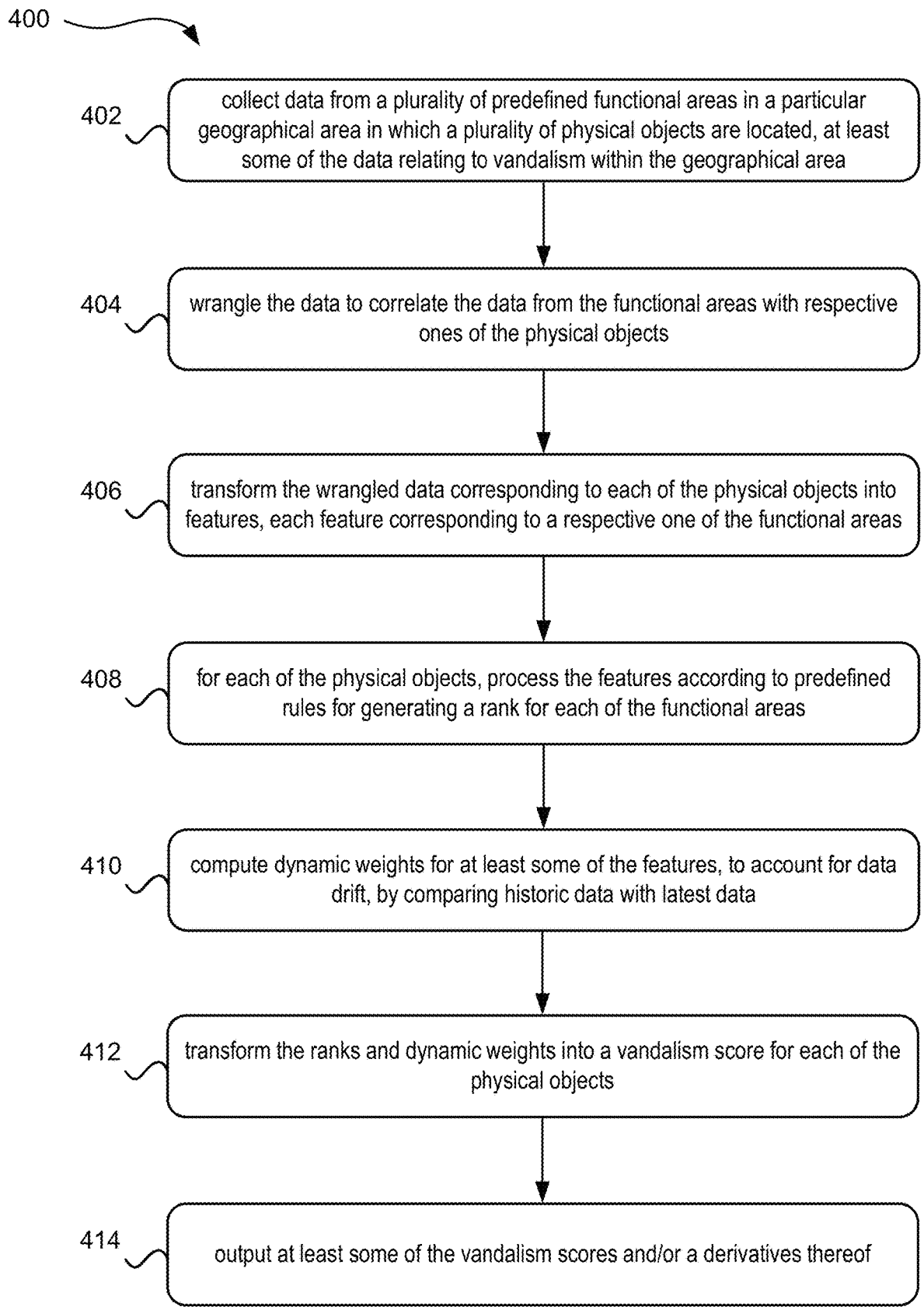
FIG. 4 is a flowchart of a method, in accordance with one embodiment of the present invention.

Now referring to FIG. 4, a flowchart of a method 400 is shown according to one embodiment. The method 400 may be performed in accordance with the present invention in any of the environments depicted in any of the other FIGS., in various embodiments. Note especially FIG. 5 et seq. and related description below, which exemplifies performance of the method 400 in the context of the ATM example, with exemplary algorithms and parameters that can be implemented in method 400. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where data is collected from a plurality of predefined functional areas in a particular geographical area in which a plurality of physical objects are located. At least some of the data relates to vandalism within the geographical area. For example, looking back to FIG. 3, data specifically relating to vandalism potentially includes at least some of the data in the insurance claims functional area, and at least some of the data in the security video-related functional area. Note that if some data specifically relating to vandalism is not collected, the results of the method 400 will be inaccurate.

In operation 404, the data is wrangled to correlate the data from the functional areas with respective ones of the physical objects. Data wrangling is a term in the art for the process of transforming and mapping data from a raw data form to another format that is more useful in subsequent operations than the raw data. The data wrangling may include a sequence of extracting the data in a raw form from the data source, and sorting or parsing the data into predefined data structures that correlate the data with the associated physical object. The resulting content may be passed to another operation in the process, stored for later use, etc. In preferred approaches, the data is wrangled down to a per-physical-object granularity. In the ATM example, data is correlated to each particular ATM.

In operation 406, the wrangled data corresponding to each of the physical objects is transformed into features, each feature corresponding to a respective one of the functional areas. See, inter alia, FIG. 6 and related description for an exemplary procedure for the transformation of data into features.

In operation 408, for each of the physical objects, the features are processed according to predefined rules for generating a rank for each of the functional areas. Any predefined rules that would become apparent to one skilled in the art after reading the present disclosure may be used.

In preferred embodiments, processing the features according to predefined rules for generating the rank for each of the functional areas considers two or more of: Recency, Frequency, Monetary (RFM) parameters of the corresponding data and/or features. Moreover, R vs M and F vs M values may be computed.

Recency generally refers to how recent a data point is, or in other words, how long ago the event occurred. Frequency generally refers to the number of events occurring in a relevant time period as reflected in the data. Monetary generally refers to any monetary aspect.

Figure 6:
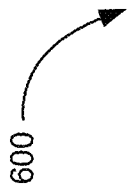
FIG. 6 is a table illustrating how ranks are computed, before computing the vandalism score, in accordance with one embodiment.

See, inter alia, FIG. 6 and related description for an exemplary procedure for generating a rank for a functional area.

In operation 410, dynamic weights are computed for at least some of the features, to account for data drift. The weights are computed by comparing historical data with latest data, e.g., the latest n number of records, data from the last few hours or days, etc. Preferably, the historical data is data from a time period having no vandalism, thereby providing a clean reference baseline.

Preferably, the weight is computed dynamically using a Population Stability Index (PSI) for the corresponding feature. The weight is passed as an additional parameter to vandalism score computation and clustering.

The weights are computed for relevant features that will have a high weight value, thus contributing significantly to the vandalism score computation. For example, if the crime rate or insurance claims are suddenly increased, then these factors should have higher PSI values. Thus, PSI may be used to compute the drift in the feature distribution. Preferably, the PSI provides a single value that reflects any potential drift in the feature distribution. The PSI value may be used as the dynamic weight of the corresponding feature. This is particularly useful in situations such as a rise in the crime rate or insurance claims, as these factors can be assigned a higher PSI value. Ultimately, such relevant features will be assigned a higher weight value and contribute significantly to the vandalism score computation.

The base and target sample sizes for computation of the weights may be of any size. The minimum sample size for population stability index can vary depending on the characteristics of the population being studied.

In one example, the base sample size is 1000 records from the history data for a period of time with zero vandalism. The target sample is the latest 1000 records or the most recent few hours of data. The bin size (B) is 10 equal width bins. The range is divided into 10 equal parts.

The following equation may be used to calculate PSI.

$$PSI = \sum_{b=1}^{B} (\% \text{ Actual} - \% \text{ Expected}) \times \left( \ln \left( \frac{\% \text{ Actual}}{\% \text{ Expected}} \right) \right)$$

Equation 1 where:
Actual=the most recent information of the feature,
B=total number of bins,
% Actual=the proportion of counts within bin b from the actual distribution, and
% Expected=the proportion of counts within bin b from the expected distribution.

The PSI values of all features are preferably scaled. For example, the PSI values may be scaled such that they are in a predefined range, e.g., the weights have a value between 0 and 1. This normalizes the dynamic weights, thereby making the computation more efficient and accurate. Note also that the bin size and sample size can be considered as hyper parameters which can be tuned to find the optimal values that provide the most accurate weights.

FIGS. 7-8 and related description provides an example of computation of weights for the insurance claims functional area.

In operation 412, the ranks and dynamic weights are transformed into a vandalism score for each of the physical objects.

In one approach, a clustering analysis is performed on the ranked features and dynamic weights to determine a number of clusters having physical objects with a similar impact from vandalism. A clustering analysis generally refers to grouping a set of objects in such a way that objects in the same group (a cluster) are more similar in one or more ways to each other than to those objects in other groups.

The requisite similarity may be based on predefined rules, may be defined by the clustering analysis, etc. In some embodiments, each resulting cluster represents a zone (geographical area) having a similar impact from vandalism, for example, a zone where a number of affected ATMs reside that have similar vandalism impacts. Thus, particular geographical locations can be classified into zones that have a similar impact from vandalism. In other approaches, the physical objects are sorted into clusters regardless of relative location to one another, e.g., as in the example described with reference to FIG. 9.

Any clustering analysis technique that would become apparent to one skilled in the art after reading the present disclosure may be used. Examples of clustering analyses that may be used in various embodiments include connectivity models such as hierarchical clustering that builds models based on distance connectivity; centroid models such as the k-means algorithm that represents each cluster by a single mean vector; distribution models in which clusters are modeled using statistical distributions, such as multivariate normal distributions used by the expectation-maximization algorithm; density models, for example, DBSCAN and OPTICS define clusters as connected dense regions in the data space; subspace models, in which biclustering (also known as co-clustering or two-mode-clustering), clusters are modeled with both cluster members and relevant attributes; group models; graph-based models; signed graph models; and neural models.

In one approach, a vandalism score is computed for each zone identified using the clustering analysis. The vandalism score Si for each ith physical object is computed according to the following equation:

$$\text{Score } Si=(Bi-Ai)/\text{Max}(Ai,Bi)$$

Equation 2 where:
Ai=average distance from an ith object to all other objects in the cluster, and
Bi=average distance from the ith object to any cluster not containing that object.
The maximum such value is computed with respect to all clusters taken into analysis.

In a preferred approach, the vandalism score is computed according to the general methodology set forth below with reference to FIG. 9.

In operation 414, at least some of the vandalism scores are output. Also and/or alternatively, derivatives of the vandalism scores, such as recommendations and/or insights based on the vandalism scores, may be output.

Figure 10:
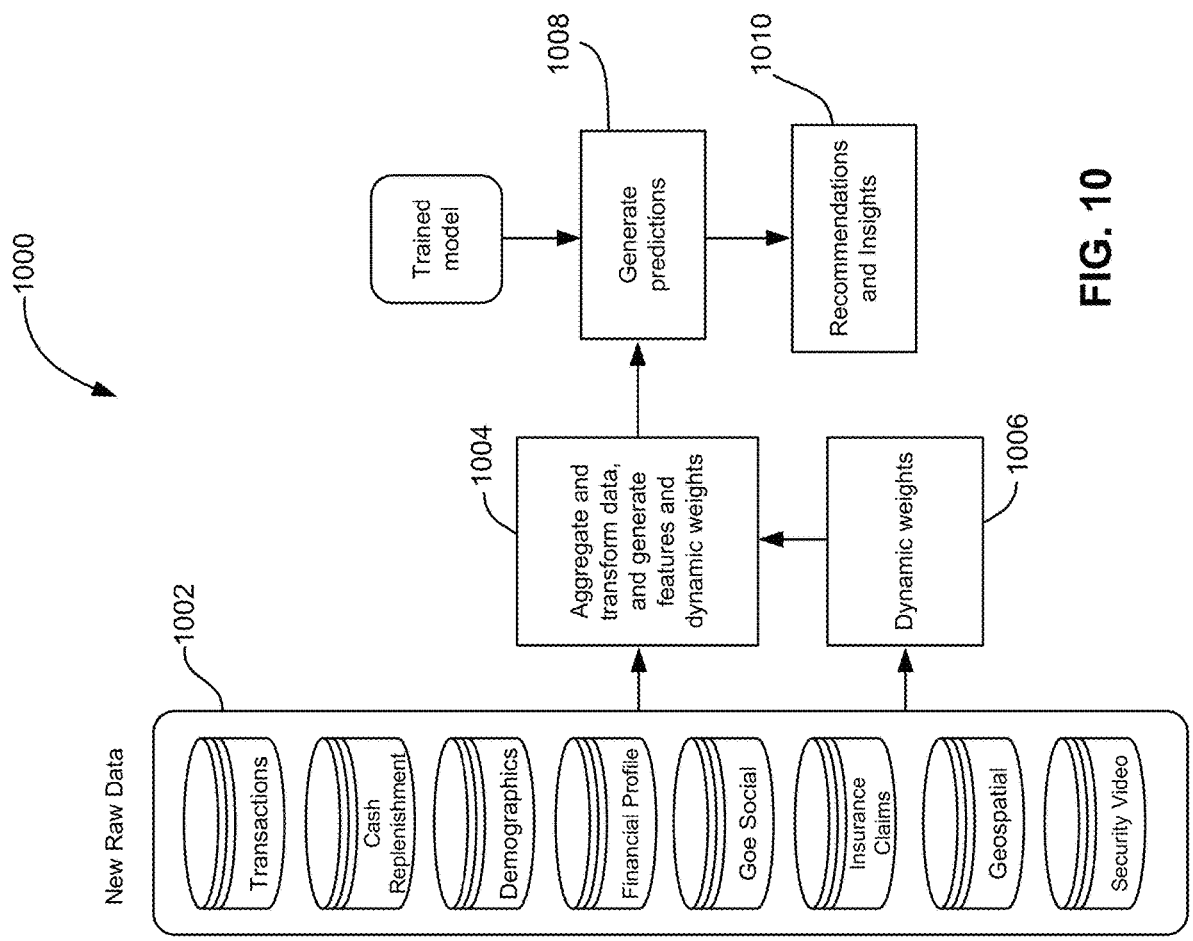
FIG. 10 is a flow diagram of a process for model scoring, in accordance with one embodiment.

The method 400 may include further operations, such as training an artificial intelligence (AI) model using the data and vandalism scores, processing new data using the AI model to generate vandalism predictions based on the new data, and outputting the vandalism predictions. See, inter alia, FIG. 5 and related description for a methodology for training an AI model. FIG. 10 and related description describe use of the trained AI model on unseen (new) data.

Moreover, the method may include performing transfer learning using the trained AI model to generate vandalism predictions for second physical objects of a type that is different than a type of the physical object. The second physical objects are used in a completely different industry than the physical objects. See, e.g., FIG. 11 and related description.

Method 400 is performed using a computerized system, as such method 400 cannot practically be performed by a human, given the complexities of the calculations and sheer amount of data that is processed. Moreover, any attempt by a human to perform such method 400 would be expected to be rife with errors, again given the complexities of the calculations and sheer amount of data that is processed.

Figure 5:
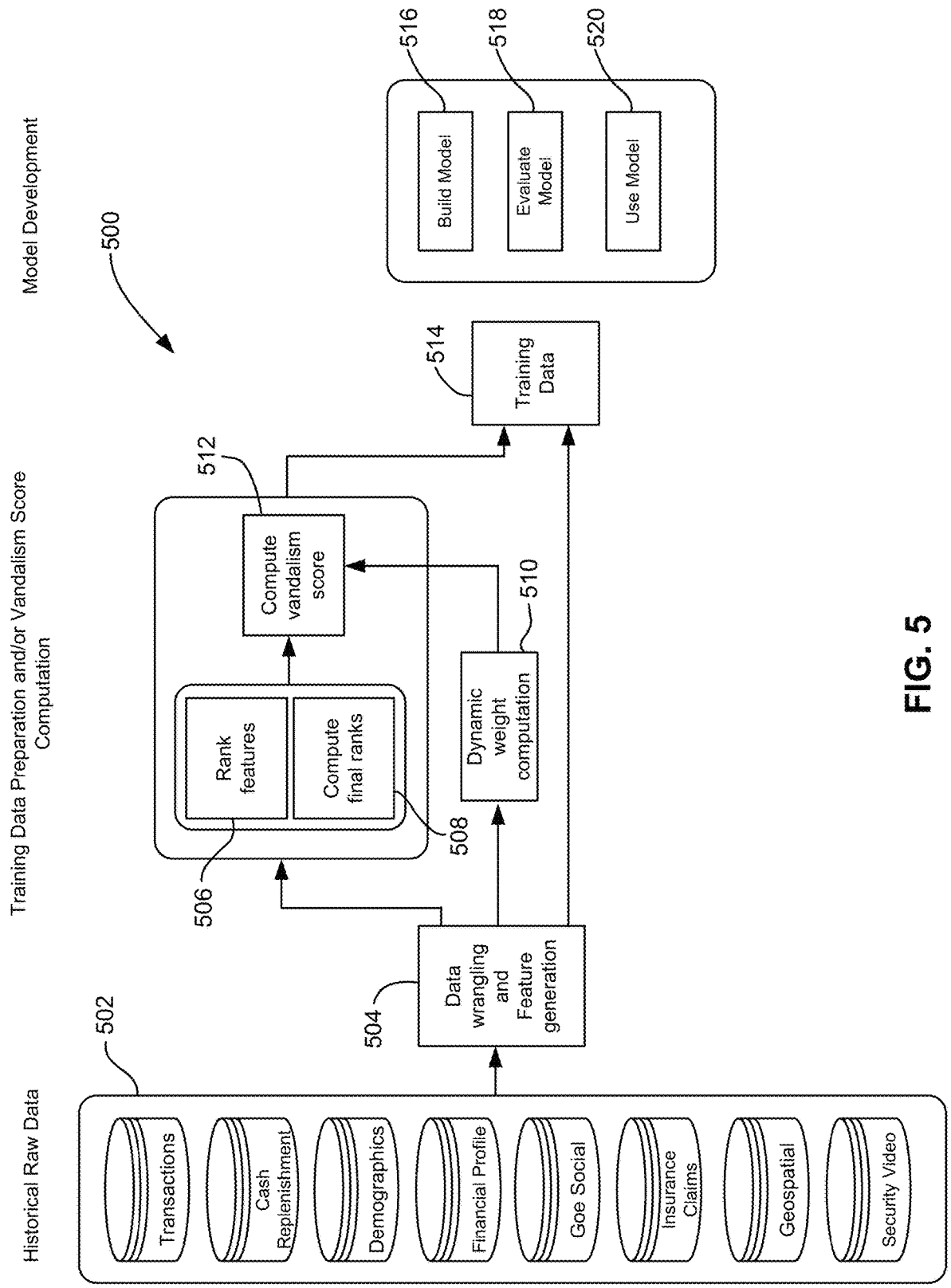
FIG. 5 is a flowchart of an exemplary method for computing vandalism scores for ATMs, and training an AI model, in accordance with one embodiment.

Now referring to FIG. 5, a flowchart of an exemplary method 500 for computing vandalism scores for ATMs, and training an AI model is shown according to one embodiment. The method 500 may be performed in accordance with the present invention in any of the environments depicted in the other FIGS. described herein, in various embodiments. Of course, more or fewer operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, the method is segmented into three parts: historical raw data collection, training data preparation and vandalism score computation, and model development.

Method 500 may initiate with operation 502, where data from the functional areas is collected. The functional areas and exemplary data in this example are those shown in FIG. 3.

In operation 504, data wrangling is performed to bring the grain of the data down to the ATM level, the ATM identifier (ID) in this case.

Features are also generated in operation 504. Feature generation may include aggregating data to a single value according to known aggregation rules to create features for each of the functional areas. For example, insurance claims data may be summed to achieve a total insurance claims value over the relevant time period, where the feature is the total insurance claims value.

In operations 506 and 508, the features from all segments are ranked, and final rank features are computed. An example of ranking follows.

FIG. 6 depicts a table 600 illustrating how ranks are computed, before computing the vandalism score, according to one approach. The insurance claims functional area and related data is used as the example here.

As shown, the table 600 includes historical insurance claim information about ten ATMs in a particular geographical area. As noted above, ATMs are used here as an example only. For example, instead of ATMs, the objects could be bank branches, or even physical locations.

The insurance claim data collected in operation 502, and wrangled and converted into features in operation 504 of FIG. 5 is included in columns 204 of the table 600 as total insurance claims for each ATM, the frequency of the claims, and recency of the claims. For example, the insurance claims value field for ATM 1 is zero, meaning ATM 1 had no insurance claims. The features represent data created and/or collected over a relevant period. However, for ATM 3, the total value of the insurance claims over the relevant period was 0.5 million. The relevant period may be any amount of time, such as a predefined number of months, a predefined number of years, or for all time in the past for which there is date.

With continued reference to FIG. 6, the features in the second, third and fourth columns of the table 600 are transformed into rank values, shown in the fifth, sixth and seventh columns. The rank values and their meanings are as follows:

Value Rank: The higher the insurance claim, the higher the rank.

Frequency Rank: The higher the frequency of claims, the higher the rank.

Recency Rank: The lower the recency (e.g., in days), the higher the rank.

Accordingly, in the example shown, the raw features are converted into a numerical rank output, e.g., by comparison of the respective feature value to a table of feature values to rank values, or using any other technique that would become apparent to one skilled in the art after reading the present disclosure.

The numerical output has domain relevance. For example, if the insurance claim is higher, a higher ranking is given to that field. Likewise, if the frequency of claims is higher, the frequency ranking is assigned a higher ranking.

In one exemplary use case, if an insurance claim is for a relatively higher dollar amount than another insurance claim, the higher claim would be given a higher ranking than the claim for the lower amount. Likewise, if an insurance claim is recent, it would be given a higher ranking than older claims. Moreover, a relatively larger number of insurance claims for one geographical location would be ranked higher than claims for another location.

Thus, the rankings provide an overall sense of insurance risk for each of the ATMs.

A final Insurance Claim Rank is computed for each ATM by averaging the three rank values listed above. If desired, a weighted average may be created to emphasize their importance in the computations.

A similar approach is taken to compute final rank values for each of the other functional areas for each ATM, based on the data from the respective functional area.

Accordingly, the raw data collected at operation 502 of FIG. 5 has, at this point, been transformed into a smaller number of features, and again transformed into a final rank value per functional area. Those final rank values have predictive power; accordingly, the model can learn from the aspects of each functional area when performing the vandalism score calculation.

All individual final rank attributes are usable in vandalism score computation. Moreover, because the data and/or features are converted to a numerical representation (rank), training of the AI model is much easier.

Referring again to FIG. 5, operation 510 includes computing dynamic weights for at least some of the features, e.g., to account for any changes in the data over time. Preferably, more weightage is given to a feature which will contribute more to the vandalism score in real time by comparing the incoming data with history data over a period with zero vandalism. For example, if the feature drift has a high value, then a higher weight will be assigned to that feature for performing the clustering analysis and/or calculating the vandalism score.

An example of a feature that may be dynamically given a weight is a feature that includes a current event of social unrest. The historical data may not include any instances of social unrest, so the weight ensures the model is influenced by the current event of social unrest.

A model that computes the vandalism score is made more robust by dynamically changing the weights based on how vandalism is actually happening in real time.

Any method to compute a dynamic weight that would become apparent to one skilled in the art after reading the present disclosure may be used. In one approach, the dynamic weight is computed using a PSI method for each feature. The PSI method may be akin to the PSI method described above with reference to operation 410 of FIG. 4. The weight is passed on as an additional parameter for computing the vandalism scores.

Note that while the AI model is primarily trained on historical data, the weights from operation 510 improve the results of the model by accounting for variations in the data.

FIG. 7 depicts a table 700 illustrating calculation of weights for the insurance claims functional area for ATM 1, in accordance with one exemplary approach.

In this example, dynamic weights are computed via the PSI method using Equation 1. The data drift is computed by comparing historical data with actual data. As shown, the insurance claims are sorted into bins based on claim size. The columns in the table 700 are as follows:

- Expected Count is a count of the data points in each bin from the base sample, preferably composed of historical data collected over a period with little, and ideally no, vandalism.
- Actual Count is the count of the data points in each bin from the recent (target) sample.
- Expected % is the portion of the population in each bin from the base sample.
- Actual % is the portion of the population in each bin from the recent sample.
- PSI is the PSI value for that bin.

The Dynamic Weight in the table 700 is an aggregation (sum) of the PSI value of all ten bins. That sum is the dynamic weight applied for the insurance claims feature. This weight is then used in the computation of the vandalism score.

Similar computations are preferably performed for each of the functional areas shown in FIG. 3. Whichever functional area is causing more vandalism, it should have a higher dynamic weight. For example, if the crime rate or insurance claims are suddenly increased, compared to the expected distribution, then those features would be expected to have a higher PSI value, and thus those features would have more impact on calculation of the vandalism score.

FIG. 8 depicts a table 800 listing the dynamic weights computed for each functional area, for each of the ten ATMs in the ongoing example. For each ATM, the weights (PSI) are aggregated, e.g., summed, and listed in the Group Sum Total column. As mentioned earlier, the PSI value may be used to measure drift in a distribution because it is expected that the data will change over time. The PSI values quantify that drift in a distribution.

All individual dynamic weights are then used to compute a vandalism score, e.g., as described above and/or below.

Referring again to FIG. 5, a vandalism score is computed for each of the physical objects in operation 512 using at least the ranks and dynamic weights.

Figure 9:
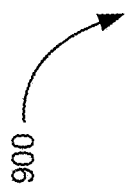
FIG. 9 is a table illustrating calculation of vandalism scores and clustering for ten ATMs, in accordance with one exemplary approach.

FIG. 9 depicts a table 900 illustrating calculation of vandalism scores and clustering for the ten ATMs, in accordance with one exemplary approach.

As shown, the table 900 includes rank values for each functional area for each ATM. The rank values are summed to arrive at the Group Sum Total score for each ATM device. Each of the dynamic weights are summed up to arrive at the Dynamic Weight Total.

The Group Sum Totals, Dynamic Weight Total, and other values compute for each ATM such as, but not limited to, the ranks, R versus M scores, F versus M scores, and so on are used to compute a Net Vandalism Score using any technique that would become apparent to one skilled in the art after reading the present disclosure.

As shown, ATM 7 has the highest vandalism score, and therefore is believed, based on the available data, to be most prone to vandalism. By extension, any physical object in geographical vicinity to ATM 7 would also be expected to be more prone to vandalism than it would be if located near any of the other ATMs. Accordingly, the scores here can be extended to other items that are not ATMs via transfer learning. Thus, though the scores above were computed for ATMs, the scores can be applied to any other object in close proximity to the ATMs to predict the impact of vandalism on such other object.

The net vandalism scores may in turn be used to compute the cluster zones, thereby specifying which cluster each ATM belongs to. Note that the number of clusters is assumed to be 3 in this illustration. As shown, the ATMs are assigned to zone 1, zone 2, or zone 3, where each zone corresponds to a level of vandalism. Note, for example, ATM 2, 3 and 7 all have net vandalism scores above 1, and are therefore clustered into zone 3. Thus, each zone may generally correspond to a severity of vandalism in the larger geographical area.

As an option, the data may be sorted to determine and tag which ATM falls into which cluster, based on the number of clusters.

The higher the "Net Vandalism Score", the higher the risk for the corresponding ATM, Bank or region. Zonal prioritization may be performed based on the Net Vandalism Score to classify the ATMs into zonal buckets for better interpretability.

Referring again to FIG. 5, training data is collected in operation 514. The training data may include both data and/or features from operation 504, as well as output from operation 512. The training data may then be used to build and train the AI model. See operations 516 and 518.

In operation 520, the model is used.

In one embodiment, the net vandalism scores may be computed during training of the AI model. In another embodiment, a known set of training data may be used. For example, the information submitted to the model during training may include data labeled correctly by a subject matter expert (SME). Any known procedure for training an AI model may be used. In one exemplary approach, the initial set of data from the functional areas is used as training data. Some percentage of that data is labeled by the SME and used to perform the initial training of the model. Then the rest of the data is passed through the model and at least a sampling of the data is checked by the SME for proper labeling. In one approach 25-50% of the data is initially labeled by the SME and fed through the model, and the remaining data is fed through the model and at least some of the resulting labels checked. Any corrections may be made to the labeling and applied to the model in a conventional manner. For example, if the results are not as expected, the model can be tuned to improve the accuracy of the outputs, e.g., by iterating through further training. Once the model is deemed adequate for its intended purposes, the model is used to predict vandalism scores and/or clustering according to unseen data, which is new data coming in.

To ensure the model does not become stale due to changes in the functional areas, the dynamic weight computation and real time adjustments are used to maintain efficacy of the model. Any known active learning technique may be used to ensure that the AI model continues to be updated and thereby remains accurate.

Once the model is trained, the trained model may be used to predictions for unseen data. This is called model scoring.

FIG. 10 depicts a process for model scoring, in accordance with one embodiment. The method 1000 may be performed in accordance with the present invention in any of the environments depicted in the other FIGS. described herein, in various embodiments. Of course, more or fewer operations than those specifically described in FIG. 10 may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art.

Method 1000 may initiate with operation 1002, where data from the functional areas is collected, e.g., as in operation 502 of FIG. 5.

In operation 1004, data wrangling is performed to bring the grain of the data down to the object level, and transform the data to features, e.g., as in operation 504 of FIG. 5.

In operation 1006, dynamic weights are computed and applied to the features generated in operation 1004.

In operation 1008, the trained model is applied to features corresponding to the new data to generate predictions for each object, e.g., the ATMs of the ongoing example.

In operation 1010, recommendations and/or insights are determined based on the output of the model. Recommendations and insights may include any types of recommendations and insights that would become apparent to one skilled in the art upon reading the present disclosure. For example, recommendations and insights may include recommendations to set up a physical item, business, etc. in a certain way or to operate in a certain way in certain regions. If someone wishes to build a hospital in a particular location, data corresponding to a hospital can be processed through the pipeline shown, using the AI model trained on the ATM data, to generate predictions of vandalism from the hospital-related data. Note that data from some of the functional areas used for the ATMs can also be applied to the model.

Preferably, the recommendations and insights are transformed into natural language for end user consumption.

Figure 11:
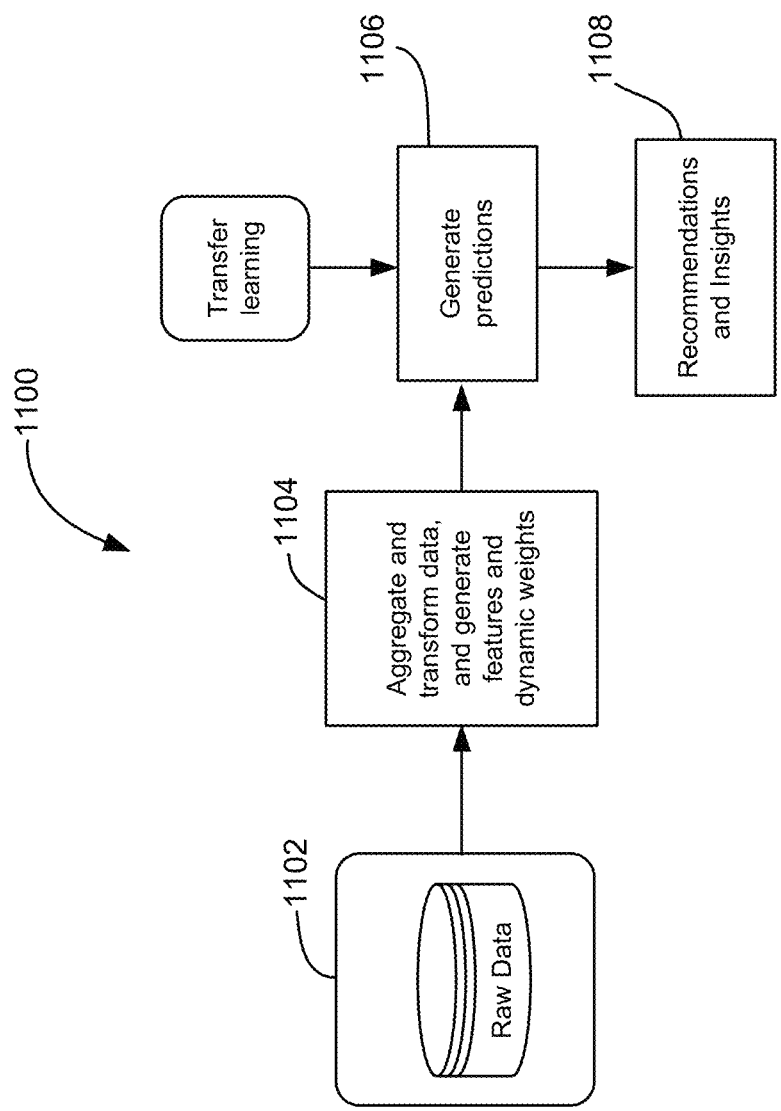
FIG. 11 is a flow diagram of a process for using transfer learning to predict vandalism for other domains using a model trained for other objects, in accordance with one embodiment.

FIG. 11 depicts a method for using transfer learning to predict vandalism for other domains using a model trained for other objects, in accordance with one embodiment. The method 1100 may be performed in accordance with the present invention in any of the environments depicted in the other FIGS. described herein, in various embodiments. Of course, more or fewer operations than those specifically described in FIG. 11 may be included in method 1100, as would be understood by one of skill in the art upon reading the present descriptions.

Each of the steps of the method 1100 may be performed by any suitable component of the operating environment. For example, in various embodiments, the method 1100 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 1100. Illustrative processors include, but are not limited to, a central processing unit (CPU), an application specific integrated circuit (ASIC), a field programmable gate array (FPGA), etc., combinations thereof, or any other suitable computing device known in the art.

Method 1100 may initiate with operation 1102, where data from the functional areas corresponding to the new objects is collected, e.g., as in operation 1002 of FIG. 10.

In operation 1104, data wrangling is performed to bring the grain of the data down to the object level, and transform the data to features, e.g., as in operation 1004 of FIG. 10. Preferably, new raw data encompassing external and internal data points is wrangled and transformed and dynamic weight will be calculated using PSI. Features are generated to get the data compatible for model scoring.

In operations 1106 and 1108, the trained model is applied on the new data processed via transfer learning to generate predictions in a new domain and recommend actionable insights.

Deep learning models use huge amounts of data and are very resource intensive. Therefore, leveraging data from across domains is an efficient way to 'learn once and predict' in multiple domains. Transfer learning also reduces the need to design and train the model from scratch, resulting in significant savings in time and computer resources.

This approach leverages learnings from one domain and generates predictions on variety of other domains (such as government premises, luxury hotels, shopping complexes, hospitals, universities, and so on) without any need for model designing and training from scratch Thus, some embodiments leverage the learning made for one domain, e.g., ATMs, to predict vandalism for other domains, such as such as government premises, luxury hotels, shopping complexes, hospitals, universities, and so on without the need to train a model from scratch.

Benefits and Practical Applications

The foregoing methodology, in accordance with various embodiments, provides a plethora of benefits and practical applications.

In some embodiments, by considering a hyperdimensional space, the scoring mechanism for vandalism reduces the inherent skew and bias in the underlying data, thereby providing better predictions.

In addition, some embodiments use a scientific, distance driven clustering method where each parameter is normalized and used to arrive at a computed score. The computed score is then used to determine clustering or categorization of geographical areas (zones) where valuable assets/devices are or may be located which should be prioritized for remediation and/or avoidance.

Further, some embodiments determine probable causes leading to vandalism, thus predicting vandalism in advance, allowing a business to make a better decision about where to deploy assets, enhance security, etc.

In addition, some embodiments leverage the learning made for one domain to predict vandalism for other domains, without the need to train a model from scratch.

The embodiments described herein also benefit other technologies, such as disaster recovery, by enabling prediction of locations that are more likely to experience a need for such other technologies. For example, disaster recovery planning can consider the likelihood of damage to property when determining allocation of disaster recovery resources. For example, the data from an ATM that is more likely to be vandalized can be received, backed up, etc. more frequently than other ATMs that are less likely to be vandalized. In yet another example of a benefit to another technology, a vandalism score and probable causal factors can be used by insurance underwriters and/or insurance underwriting software to evaluate and analyze the risks involved before insuring assets in vandalism prone areas.

In another example of a benefit to another technology, the methodology presented herein can be adjusted to use the same collected data to instead provide actionable insights and guidance for a technology not related to vandalism at all via transfer learning. For instance, for banks, the results of processing the data using the adjusted AI model can provide recommendations usable for determining replenishment requirements for money in an ATM, e.g., amount of replenishment, frequency of replenishment, and/or denominations of replenishment. For example, the results of the AI processing may determine that an ATM at an airport will likely conduct fewer transactions but more high value transactions than an ATM at a train station. Thus, the results of the AI processing may indicate that the ATM at the airport may need relatively less frequent replenishment, but needs more larger bills.

As yet another example of a benefit to another technology, business and industry device failure prediction can be augmented with vandalism scoring to boost overall prediction capability.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   in response to receiving data from a plurality of predefined functional areas in a particular geographical area in which a plurality of physical objects are located, wrangling the data to correlate the data from the functional areas with respective ones of the physical objects, wherein the data are collected from the plurality of predefined functional areas in the particular geographical area in which the plurality of physical objects are located;
   transforming the wrangled data corresponding to each of the physical objects into features, each feature corresponding to a respective one of the functional areas;
   for each of the physical objects, processing the features according to predefined rules for generating a rank for each of the functional areas;
   computing dynamic weights for at least some of the features to account for data drift by comparing historical data with latest data;
   transforming the ranks and the dynamic weights into a vandalism score for each of the physical objects, wherein a clustering analysis is performed on the rank and the dynamic weights to determine a number of clusters of the physical objects having a similar impact from vandalism; and
   outputting at least some of the vandalism scores and/or derivatives thereof.

2. The computer-implemented method of claim 1, wherein the functional areas include at least four functional areas selected from the group consisting of: bank transactions, financial profile information, cash replenishment metrics, social media feeds, security video-related information, insurance claims information, and geospatial data.

3. The computer-implemented method of claim 1, further comprising outputting the clusters, wherein at least some of the data relates to vandalism within the geographical area.

4. The computer-implemented method of claim 3, wherein the vandalism score $S_i$ for each ith physical object is computed according to the following equation:

$$\text{Score } S_i = (B_i - A_i)/\text{Max}(A_i, B_i)$$

where:
$A_i$=average distance from an ith object to all other objects in the cluster, and
$B_i$=average distance from the ith object to any cluster not containing that object.

5. The computer-implemented method of claim 1, wherein processing the features according to predefined rules for generating the rank for each of the functional areas considers two or more of: recency, frequency, and monetary parameters of the corresponding data.

6. The computer-implemented method of claim 1, wherein the dynamic weights are computed using a Population Stability Index (PSI) for the corresponding feature.

7. The computer-implemented method of claim 1, further comprising normalizing the dynamic weights such that all dynamic weights are within a predefined range.

8. The computer-implemented method of claim 1, wherein the historical data is data from a time period having no vandalism.

9. The computer-implemented method of claim 1, wherein the physical objects are automated teller machines.

10. The computer-implemented method of claim 1, further comprising training an artificial intelligence (AI) model using the data and vandalism scores; processing new data using the AI model to generate vandalism predictions based on the new data; and outputting the vandalism predictions.

11. The computer-implemented method of claim 10, further comprising performing transfer learning using the trained AI model to generate vandalism predictions for second physical objects of a type that is different than a type of the physical objects.

12. The computer-implemented method of claim 11, wherein the second physical objects are used in a different industry than the physical objects.

13. A computer program product for computing a vandalism score for each of a plurality of physical objects, the computer program product comprising a computer readable storage medium having program instructions embodied therewith, the program instructions executable by a computer to cause the computer to:
   in response to receiving data from a plurality of predefined functional areas in a particular geographical area in which a plurality of physical objects are located, wrangle, by the computer, the data to correlate the data from the functional areas with respective ones of the physical objects, wherein the data are collected from the plurality of predefined functional areas in the particular geographical area in which the plurality of physical objects are located;
   transform, by the computer, the wrangled data corresponding to each of the physical objects into features, each feature corresponding to a respective one of the functional areas;
   for each of the physical objects, process, by the computer, the features according to predefined rules for generating a rank for each of the functional areas;
   compute, by the computer, dynamic weights for at least some of the features to account for data drift by comparing historical data with latest data;
   transform, by the computer, the ranks and the dynamic weights into a vandalism score for each of the physical objects, wherein a clustering analysis is performed on the rank and the dynamic weights to determine a number of clusters of the physical objects having a similar impact from vandalism; and
   output, by the computer, at least some of the vandalism scores and/or derivatives thereof.

14. The computer program product of claim 13, wherein the functional areas include at least four functional areas selected from the group consisting of: bank transactions, financial profile information, cash replenishment metrics, social media feeds, security video-related information, insurance claims information, and geospatial data.

15. The computer program product of claim 13, wherein processing the features according to predefined rules for generating the rank for each of the functional areas considers two or more of: recency, frequency, and monetary parameters of the corresponding data.

16. The computer program product of claim 13, wherein the dynamic weights are computed using a Population Stability Index (PSI) for the corresponding feature.

17. The computer program product of claim 13, wherein the historical data is data from a time period having no vandalism.

18. The computer program product of claim 13, wherein the physical objects are automated teller machines.

19. The computer-implemented method of claim 1, further comprising training an artificial intelligence (AI) model using the data and vandalism scores; processing new data using the AI model to generate vandalism predictions based on the new data; outputting the vandalism predictions; and performing transfer learning using the trained AI model to generate vandalism predictions for second physical objects of a type that is different than a type of the physical objects, wherein the second physical objects are used in a different industry than the physical objects.

20. A system, comprising:
   a hardware processor; and
   logic integrated with the processor, executable by the processor, or integrated with and executable by the processor, the logic being configured to:
   in response to receiving data from a plurality of predefined functional areas in a particular geographical area in which a plurality of physical objects are located, wrangle the data to correlate the data from the functional areas with respective ones of the physical objects, wherein the data are collected from the plurality of predefined functional areas in the particular geographical area in which the plurality of physical objects are located;
   transform the wrangled data corresponding to each of the physical objects into features, each feature corresponding to a respective one of the functional areas;
   for each of the physical objects, process the features according to predefined rules for generating a rank for each of the functional areas;
   compute dynamic weights for at least some of the features to account for data drift by comparing historical data with latest data;
   transform the ranks and the dynamic weights into a vandalism score for each of the physical objects, wherein a clustering analysis is performed on the rank and the dynamic weights to determine a number of clusters of the physical objects having a similar impact from vandalism; and
   output at least some of the vandalism scores and/or derivatives thereof.

* * * * *